Figure 1:
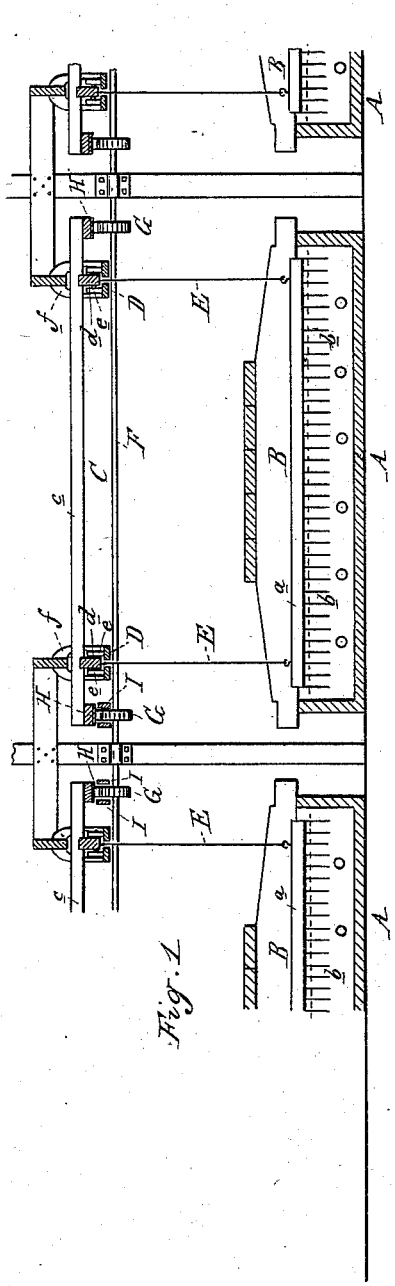

(No Model.)
2 Sheets—Sheet 1.

J. M. LAING.
MAKING SALT.

No. 254,829.　　　　　　　　　　　Patented Mar. 14, 1882.

Attest:
A. Barthel
Chas. J. Hunt

Inventor:
James M. Laing
per Thos. S. Sprague
Att'y (No Model.)  2 Sheets—Sheet 2.

J. M. LAING.
MAKING SALT.

No. 254,829. Patented Mar. 14, 1882.

Attest:
A. Barthel
Chas J. Hunt

Inventor:
James M. Laing
per Thos. S. Sprague
Att'y

UNITED STATES PATENT OFFICE.

JAMES M. LAING, OF BAY CITY, MICHIGAN.

MAKING SALT.

SPECIFICATION forming part of Letters Patent No. 254,829, dated March 14, 1882.

Application filed December 1, 1881. (No model.)

*To all whom it may concern:*

Be it known that I, JAMES M. LAING, of Bay City, in the county of Bay and State of Michigan, have invented certain new and useful Improvements in the Art of Making Salt; and my invention more particularly refers to a new method and device for stirring the brine in the grainers for the purpose of precipitating the salt crystals during the process of evaporation.

It is an old and well-known fact that if a saturated solution of any salt is stirred during the process of evaporation the crystals which form on the surface are thereby precipitated, and do not after precipitation increase in size to any appreciable extent. This method of producing granulation instead of well-developed crystals has been adopted in the art of making salt from brine by evaporation, and devices have been introduced for stirring the brine at regular intervals, whereby the salt is obtained of a uniform grain, the size of salt granules depending upon the length of time between each stirring if other conditions are not altered. Heretofore this stirring up of the brine has been performed with floats or bars suspended in the brine and agitated therein in various ways, so as to produce an agitation of the same. I have abandoned this method of agitating the brine; and my invention consists in gently moving or combing the surface of the brine by means of rakes the teeth of which dip into the brine and produce, when drawn through it, a series of local effects, the combined result of which produces a more thorough and even precipitation of salt particles, and therefore more even grades of salt. This result is obtained at the expense of less power, avoids the inconveniences arising from incrustations in the old methods, admits of arranging the mechanism for operating the rakes above the grainer out of the way of the attendants, and also does not reduce the evaporating-surface of the grainers, as submerged floats or bars do. For carrying out this method of moving or combing the brine I have adopted the devices described hereinafter and shown in the drawings, in which—

Figure 2:
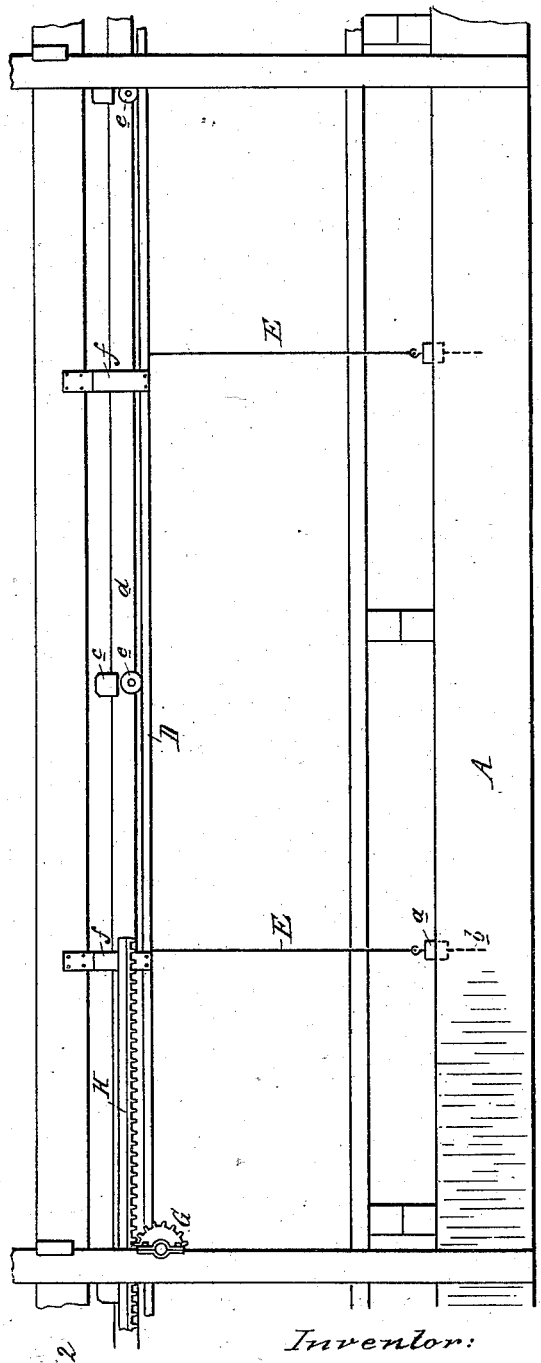
Figure 3:
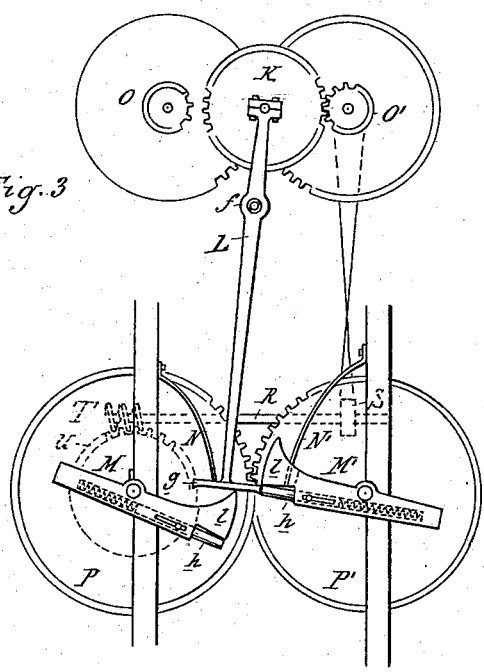
Figure 4:
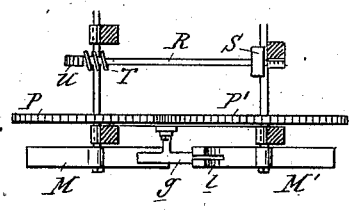

Figure 1 is a cross-section through a series of grainers provided with my device for raking off the brine. Fig. 2 is a side elevation of one of the grainers. Figs. 3 and 4 are details showing the mechanical movement for obtaining the intermittent reciprocating motion for moving the rakes.

In the drawings, which form a part of this invention, and in which like letters indicate like parts, A A are the grainers, constructed in the usual way.

B B are a series of rakes, consisting of the rake-head $a$ and a series of metal teeth, $b$, properly spaced and extending into the brine. A sufficient number of rakes are used to allow the "raking off" of the whole surface of the brine in the grainers.

The devices for moving the rakes are arranged as follows:

C is a carriage, consisting of the cross-girts $c$, bottom girts, $d$, and rollers $e$, the latter resting upon a track, D D, which is suspended by means of hangers $f\ f$, or otherwise, from the top. The track D is slotted at the middle to give passage to the rods E E, by means of which the rakes B are suspended from the carriage C.

F is a shaft, to which an intermittent oscillating motion is given, and from there communicated, by means of the cog-wheel G, to the rack-bar H, which is attached to the carriage C, and gives to the latter an intermittent reciprocating movement, in which the rakes necessarily have to follow.

I I are cheeks or guides, properly arranged to prevent the carriage C from running off the tracks.

While many mechanical movements are known and may with satisfactory results be applied for giving to the shaft F the proper intermittent oscillating movement, still I prefer the mechanical movement shown in Fig. 3, as it gives me extra facilities for adjusting and regulating said movement, all as hereinafter explained. This mechanical movement consists of the following parts:

K is a gear-wheel, journaled into one end of the lever L, which is pivoted at $f$, and provided at the other end with the cross-bar $g$.

M and M' are two revolving tappets, provided with the spring-bolts $h\ h$ and bifurcated heads $l\ l$.

N N' are two rigid arms; O O', two gear-wheels revolving in opposite directions. In practice the tappets M M' revolve at equal speed in opposite directions, being actuated thereto by two gear-wheels, P P', meshing with each other, and during one portion of their revolution the arms N N', by entering the bifurcated heads *l l*, press the spring-bolts *h h* into their recesses, from which they are then forcibly projected by the springs as soon as they pass the end of the arms N N'. At the instant they are projected they strike the cross-bar *g* of the lever L and bring the gear-wheel K into engagement with the gear O or O', as the case may be. In the drawings the action of the tappets M M' follows closely one upon another, so as to bring gear-wheel K in successive engagement with O and O', whereby the same is first revolved in one direction and then in the opposite until the heads *l* of the tappets cease to hold the lever L and allow the same to assume a position where the gear-wheel K is out of engagement with the gear-wheels O and O'. The gear-wheel K is made to transmit its motion to the shaft F in any convenient manner.

In order to gain a very desirable adjustment, I carry the motion from the shaft on which the gear-wheel O' revolves to a pulley, S, upon a counter-shaft, R, and by means of an endless screw, T, and gear-wheel U, I communicate the motion to the tappet M. By changing the size of the pulley S, I can now easily adjust the velocity of the tappets, and thereby the length of travel of the rakes.

It will be seen that with my rakes suspended from a movable carriage and dipping into the brine only a series of fine metal teeth I do not produce an agitation of the brine in the sense of former inventors, as the action of my rake-teeth produces only a series of local disturbances, which do not extend any deeper than the depth to which the rake-teeth enter the brine.

What I claim as my invention is—

1. The mode herein described of precipitating salt particles in brine, consisting in combing the surface of the brine, substantially in the manner set forth.

2. The rakes B, provided with teeth *b*, dipping into the brine and actuated on by suitable mechanism for raking off the brine, substantially as and for the purpose specified.

3. The combination of the carriage C and suspended rakes B, as and for the purpose described.

4. In combination with the carriage C, the tracks D, suspended above the grainers so as to form no obstruction around or near them, substantially as described and shown.

5. The mechanical movement for operating the rakes, consisting of the gear-wheels K O O', lever L, revolving tappets M M', and arms N N', when constructed, operating, and combined substantially as described.

JAMES M. LAING.

Witnesses:
H. S. SPRAGUE,
CHARLES J. HUNT.